United States Patent
Lim et al.

(10) Patent No.: US 9,549,049 B2
(45) Date of Patent: Jan. 17, 2017

(54) NETWORK SENSOR DEVICE

(75) Inventors: Hock Beng Lim, Singapore (SG); Mudasser Iqbal, Singapore (SG); Daiqin Yang, Singapore (SG); Talha Obaid, Singapore (SG); Teng Jie Ng, Singapore (SG)

(73) Assignees: Nanyang Technological University, Singapore (SG); Singapore Technologies Dynamics Pte Ltd, Singapore (SG)

( * ) Notice: Subject to any disclaimer, the term of this patent is extended or adjusted under 35 U.S.C. 154(b) by 173 days.

(21) Appl. No.: 14/006,545

(22) PCT Filed: Mar. 21, 2012

(86) PCT No.: PCT/SG2012/000092
§ 371 (c)(1),
(2), (4) Date: Dec. 4, 2013

(87) PCT Pub. No.: WO2012/128719
PCT Pub. Date: Sep. 27, 2012

(65) Prior Publication Data
US 2014/0080528 A1   Mar. 20, 2014

Related U.S. Application Data

(60) Provisional application No. 61/454,872, filed on Mar. 21, 2011.

(51) Int. Cl.
*H04B 7/00* (2006.01)
*H04L 29/08* (2006.01)
*H04W 48/18* (2009.01)

(52) U.S. Cl.
CPC .............. *H04L 69/32* (2013.01); *H04L 67/12* (2013.01); *H04W 48/18* (2013.01)

(58) Field of Classification Search
CPC .......... H04L 69/32; H04L 67/12; H04W 48/18
(Continued)

(56) References Cited

U.S. PATENT DOCUMENTS 8,364,786 B2 * 1/2013 Pandey .................... G06F 8/60
                                                    709/205
2005/0013280 A1 * 1/2005 Buddhikot ........ H04L 29/12358
                                                    370/349
(Continued)

OTHER PUBLICATIONS

Demo Abstract: A Virtualization Framework for Heterogeneous Sensor Network Platform. Hock Beng Lim. Nov. 4, 2009.*
(Continued)

*Primary Examiner* — Md Talukder
(74) *Attorney, Agent, or Firm* — Seed IP Law Group LLP

(57) ABSTRACT

According to an embodiment, a sensor device is provided comprising a sensor; a transceiver; a processor configured to run an application; and a virtualization layer which comprises an application programming interface encapsulating application layer features of the sensor device and which is configured to provide to the application, via at least one service access point, a service to communicate with another sensor device by means of the transceiver, a service to control the sensor and a service to discover a sensor device network, have the sensor device leave a sensor device network and/or have the sensor device join a sensor device network.

13 Claims, 10 Drawing Sheets

(58) Field of Classification Search
USPC .............................. 455/41.2, 431, 500, 422.1
See application file for complete search history.

(56) References Cited

U.S. PATENT DOCUMENTS

| | | | | |
|---|---|---|---|---|
| 2005/0090201 A1* | 4/2005 | Lengies | ............. | H04B 7/18506 455/41.2 |
| 2006/0098594 A1* | 5/2006 | Ganesh | ................. | G01D 21/00 370/328 |
| 2006/0136570 A1* | 6/2006 | Pandya | ............. | G06F 17/30985 709/217 |
| 2007/0283001 A1* | 12/2007 | Spiess | ................ | H04L 12/2602 709/224 |
| 2010/0011340 A1* | 1/2010 | Pandey | ..................... | G06F 8/20 717/107 |
| 2010/0080206 A1* | 4/2010 | Yamada | ................ | H04W 48/14 370/338 |
| 2010/0100625 A1* | 4/2010 | Monga | .................... | H04L 67/36 709/226 |
| 2010/0177674 A1* | 7/2010 | Aggarwal | ............... | H04L 45/02 370/312 |
| 2010/0322252 A1* | 12/2010 | Suganthi | ........... | H04L 29/12339 370/395.53 |
| 2011/0280154 A1* | 11/2011 | Silverstrim | ............ | G08B 21/12 370/254 |
| 2012/0185846 A1* | 7/2012 | Recio | .................... | G06F 9/5077 718/1 |
| 2012/0196565 A1* | 8/2012 | Raleigh | ............ | G06Q 10/06375 455/406 |
| 2014/0013339 A1* | 1/2014 | Lee | .......................... | G06F 9/54 719/328 |
| 2014/0080528 A1* | 3/2014 | Lim | ...................... | H04W 48/18 455/500 |

OTHER PUBLICATIONS

Lim, H. B. et al., "Demo Abstract: A Virtualization Framework for Heterogeneous Sensor Network Platforms," Proc. of the 7th Conference on Embedded Networked Sensor Systems (SenSys '09), Berkeley, CA, USA, pp. 319-320, Nov. 4-6, 2009.

Yang, D. et al., "A Sensor and Actuator Network Application Schema for Ambient Intelligence," Proc. of the 8th IEEE Consumer Communications and Networking Conference (CCNC2011), 2 pgs., Jan. 2011.

* cited by examiner

NETWORK SENSOR DEVICE

CROSS-REFERENCE TO RELATED APPLICATION

This application claims priority from United States of America provisional patent application No. 61/454,872, filed 21 Mar. 2011, the content of it being hereby incorporated by reference in its entirety for all purposes.

TECHNICAL FIELD

Various embodiments relate to a sensor device.

BACKGROUND

The rapid advances and convergence of technologies such as MEMS (Micro Electro-Mechanical Systems) sensor devices, wireless networks and low-power embedded processors have enabled a new generation of large-scale wireless sensor networks (WSN). In the near future, tiny and cheap sensors may be extensively embedded within our living environment for sensing a large variety of physical phenomena of interest to users. Unlike information services on the Internet where the information often becomes stale or even useless, sensor networks can seamlessly couple the physical environment with the digital world and deliver useful real-time information to users according to their needs.

Wireless sensor networks have attracted tremendous interest in the industry because they have many important applications including environmental monitoring, healthcare, industrial automation, military and homeland security, disaster warning and rescue, manufacturing and logistics, intelligent transportation, safety monitoring of urban and civil infrastructures, smart grid, smart buildings and homes, and many other applications that we do not yet imagine.

These enormous business prospects spurred investments in the development of sensor network platform technologies at both the hardware and software operating platform level. At the hardware level, the sensor nodes offer a mix of sensing, processing, communication and storage capabilities. Some commonly used sensor node platforms include the MicaZ, iMote2, IRIS, TelosB, Atmel Raven, Gumstix and Sentilla JCreate from vendors such as Memsic, Atmel, Gumstix and Sentilla.

However, these hardware platforms differ in the processor specifications, storage file system, communication protocols and sensor technologies. At the operating and programming platform level, these sensor node platforms are based on different platforms such as TinyOS, Contiki, .Net Micro Framework, embedded Linux, Sentilla, etc. In addition, the wireless communication protocols also vary from platform to platform and there exists a plethora of different protocols that are supported by various vendors. Some common wireless networking protocols for sensor networks include IEEE 802.15.4, ZigBee, TinyOS MAC, 6LoWPAN, SICSLoW-PAN, and GSM/3G.

SUMMARY

Various embodiments provide a sensor device comprising a sensor; a transceiver; a processor configured to run an application; and a virtualization layer which comprises an application programming interface encapsulating application layer features of the sensor device and which is configured to provide to the application, via at least one service access point, a service to communicate with another sensor device by means of the transceiver, a service to control the sensor and a service to discover a sensor device network, have the sensor device leave a sensor device network and/or have the sensor device join a sensor device network.

BRIEF DESCRIPTION OF THE DRAWINGS

In the drawings, like reference characters generally refer to like parts throughout the different views. The drawings are not necessarily to scale, emphasis instead generally being placed upon illustrating the principles of some example embodiments of the invention. In the following description, various example embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
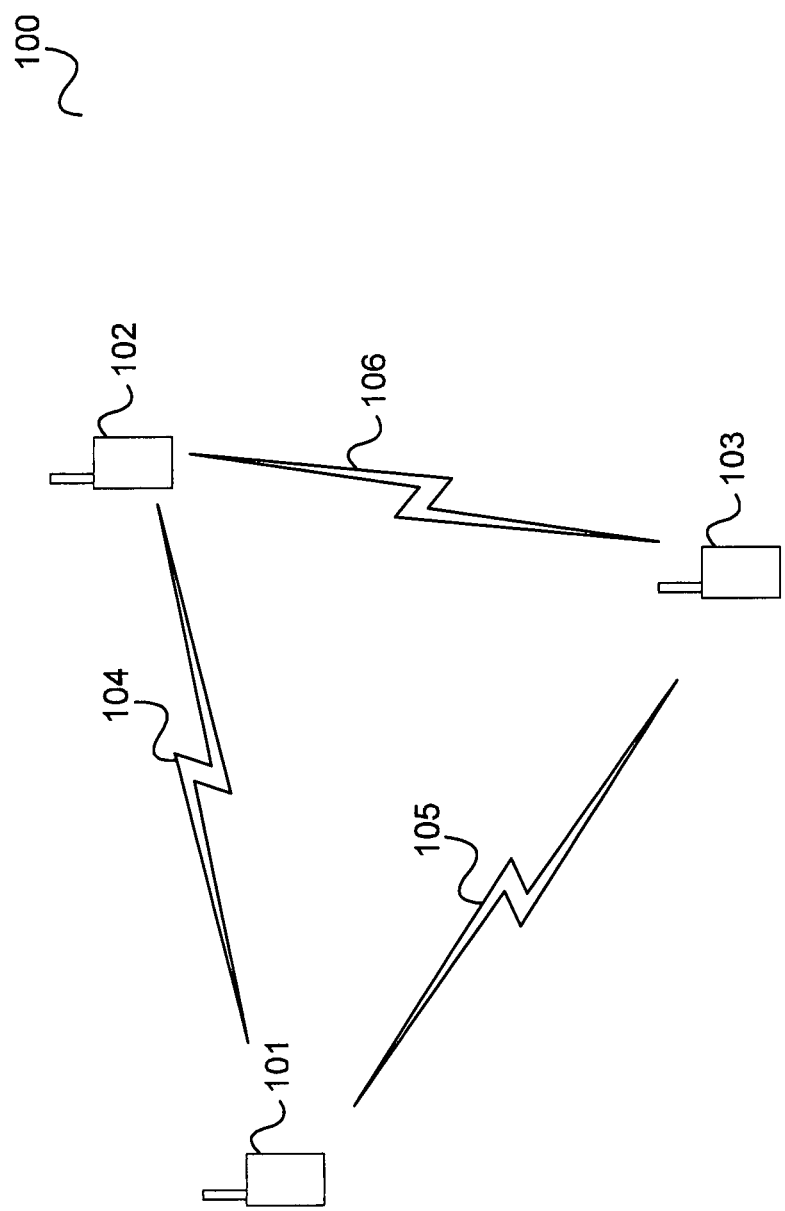
FIG. 1 shows a sensor device network (also referred to as sensor network) according to an embodiment.

FIG. 1 shows a sensor device network (also referred to as sensor network) 100 according to an embodiment.

The sensor device network 100 includes a plurality of sensor devices 101, 102, 103, in this example a first sensor device 101, a second sensor device 102 and a third sensor device 103.

The sensor devices 101, 102, 103 may communicate via communication connections 104, 105, 106, in this example a first communication connection 104 between the first sensor device 101 and the second sensor device 102, a second communication connection 105 between the first sensor device 101 and the third sensor device 103 and a third communication connection 106 between the second sensor device 102 and the third sensor device 103.

The topology of the sensor device network 100 may for example be a single hop star where all the sensor devices 101, 102, 103 are within transmission range of each other and multiple sensor nodes respond to a command node (or central controller; not shown).

The communication via the communication connections 104, 105, 106 may be carried out according to various communication protocols and may include wireless or wireline communication. For example, the communication may be carried out according to one or more of the wireless networking protocols IEEE 802.15.4, ZigBee, TinyOS MAC, 6LoWPAN, SICSLoWPAN, and GSM/3G. Different sensor devices 101, 102, 103 may support different communication protocols.

At the hardware level, the sensor devices (also referred to as sensor nodes or just nodes) 101, 102, 103 may provide functions for sensing, processing, communication and data storage. For this, they may for example include one or more sensor modules, one or more actuators, a processor and one or more memories. The sensor devices 101, 102, 103 may for example be configured according to one or more of the sensor node platforms MicaZ, iMote2, IRIS, TelosB, Atmel Raven, Gumstix and Sentilla JCreate from vendors such as Memsic, Atmel, Gumstix and Sentilla.

At the operating and programming platform level, these sensor node platforms are for example based on different platforms such as TinyOS, Contiki, .Net Micro Framework, embedded Linux, Sentilla, etc.

Different sensor devices 101, 102, 103 may be based on different platforms (and for example use different operating systems).

Heterogeneity in sensor networks can be categorized into four dimensions: hardware platform, operating system, communication stack, and application schema. The hardware platform of a sensor node defines its physical attributes including sensor modules, communication modules, embedded processors and memories. There are many commercially available hardware platforms, including MicaZ, IRIS, iMote2, TelosB, SunSpot, Gumstix, etc., which differ from each other in terms of processor feature, memory capacity, I/O interface, etc. Heterogeneity in hardware platforms results in different low-level processing mechanism, part of which can be encapsulated by the operating system and shielded from programmers. To facilitate the development of sensor network applications, there are several event-driven programming model with their tailored extensions of the C programming language. TinyOS applications are constructed through defining static wiring structure among modularized software components while Contiki C uses protothreads to support multitasking. Both of them provide a rich component library.

Apart from the hardware/software platform differences of sensor nodes, when networked sensor applications are concerned, two more heterogeneity dimensions are introduced. The first heterogeneity is the networking protocol heterogeneity. As sensor networks are usually constrained by the processing, memory, and energy limitations of sensor nodes, many application tailored networking protocols have been proposed to cope with such constraints and improve system performance. With different networking protocols, it is very difficult to integrate sensor network systems and make them interoperable. The second heterogeneity lies in the application layer which handles data and service management. Interoperable sensor nodes should share the same knowledge about how to make use of the data and other functionalities (aka services) provided by other sensor nodes.

The following items may be seen as the two main factors that affect the operation of a sensor network:

a. Application Programmability

Sensor nodes 101, 102, 103 using different hardware/software platforms may be programmed over incoherent platforms and programming interfaces which form the corresponding application layer. This includes the operating environments used such as TinyOS, Contiki, embedded Linux, etc. Each sensor node 101, 102, 103 may provide different features in a unique manner. In addition, programmability also covers the different functionalities of the sensor network 100 such as joining a network, requesting and providing data, commanding different sensor nodes 101, 102, 103 to carry out sensing tasks, etc.

Figure 2:
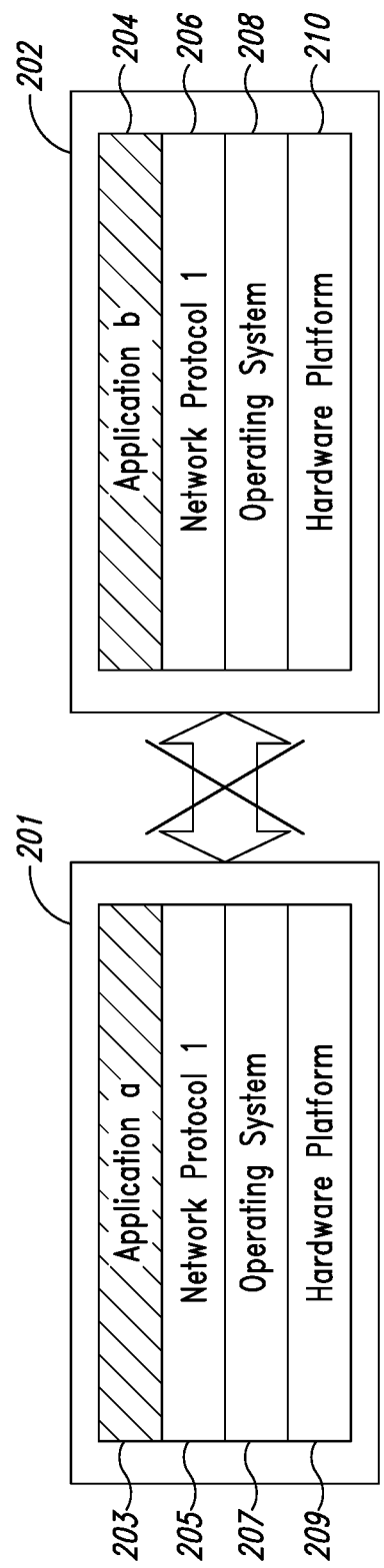
FIG. 2 shows two sensor devices.

This is illustrated in FIG. 2.

FIG. 2 shows two sensor devices 201, 202.

In this example, each sensor device 201, 202 runs a respective application 203, 204, supports a respective network protocol 205, 206, runs a respective operating system 207, 208 and is based on a respective hardware platform 209, 210.

FIG. 2 conceptually illustrates that two sensor nodes (or sensor networks in case that the sensor nodes belong to different sensor networks) 201, 202 cannot interoperate due to having heterogeneous application layers (i.e. different applications 203, 204, e.g. different applications for controlling the operating of the respective sensor device 201, 202). Even if the two sensor nodes 201, 202 have similar lower layers (e.g. if the network protocols 205, 206 are equal, the operating systems 207, 208 are equal and the hardware platforms 209, 210 are equal), they may be unable to make use of the data and other functionalities (i.e. services) provided by each other if they do not speak the same language (i.e. use a different programming model, data management, etc.). Thus, there may be difficulties in discovering what sensor nodes are available in two sensor networks, what their capabilities are, what services they offer, and how to make use of their services.

b. Interconnecting Network Protocol

At the network layer, different protocols may specify the packet formats, traffic management, the network topologies of the sensor node networks, etc.

Figure 3:
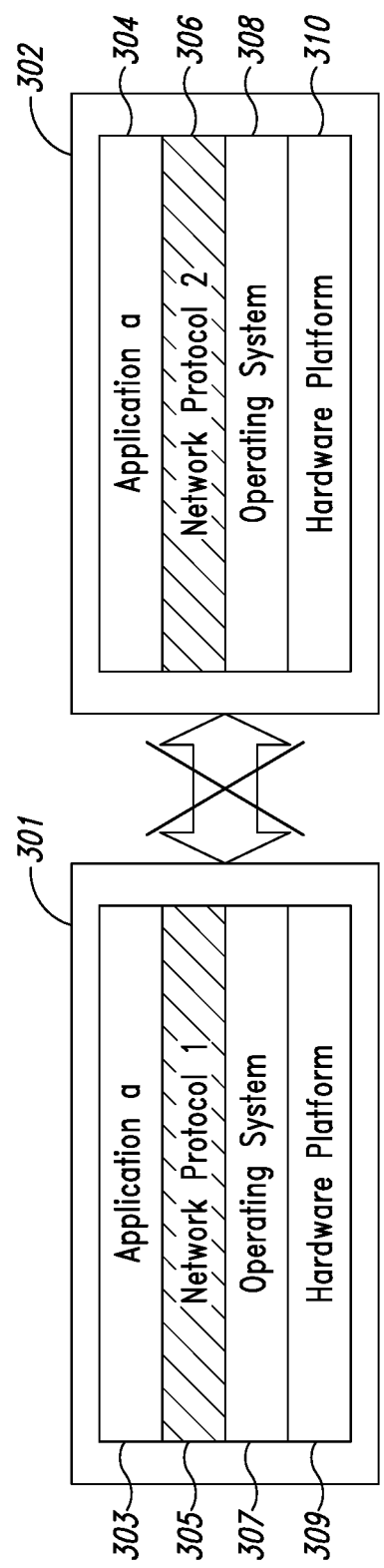
FIG. 3 shows two sensor devices.

This is illustrated in FIG. 3.

FIG. 3 shows two sensor devices 301, 302.

In this example, each sensor device 301, 302 runs a respective application 303, 304, supports a respective network protocol 305, 306, runs a respective operating system 307, 308 and is based on a respective hardware platform 309, 310.

FIG. 3 conceptually shows the lack of interoperability due to heterogeneous network layers 305, 306. If the two sensor nodes 301, 302 (or two sensor networks in case that the two sensor nodes 301, 302 are of different sensor networks) use the same application layer, they may still remain "invisible" to each other since they cannot interpret the network traffic from each other, and thus cannot be involved in in-network data processing.

Thus, sensor nodes 101, 102, 103 with heterogeneous application layers and/or network layers may not be able to interoperate, and it may thus be very difficult to build a large-scale sensor network 100 using sensor nodes 101, 102, 103 of different platforms (e.g. using different operating systems, network protocols, etc.). Indeed, most sensor network deployments make use of sensor nodes of similar platforms. In practice, a large-scale sensor network (such as a sensor network for environmental monitoring) is typically developed and deployed in several phases. A small-scale prototype sensor network is first deployed to experiment with those basic sensing-actuation tasks that are fundamental to the application. In the later phases, this sensor network is then enhanced to handle more complicated sensing tasks, employ better wireless networking technologies or harness the processing/storage power of new sensor node platforms. To build and deploy a powerful but yet cost-efficient large-scale sensor network, it typically makes sense to use sensor nodes that provide the best combination of functionalities and value for money. Also, due to the phased deployment strategy, it is impractical to replace the entire sensor network with the latest sensor node platforms, given the investment already made for the existing sensor network. In fact, it is often impractical to replace a sensor node with another node once it has been deployed in the field. Thus, the existing restriction of having to deploy similar sensor nodes in a network may greatly limit the scalability and flexibility in terms of managing the ongoing cost of deploying and upgrading sensor networks using different, cheaper and advanced sensor nodes.

These heterogeneity challenges may for example be addressed by unifying the respective layers. For example, IBM's Mote Runner and Sentilla's JCreate introduce a virtual machine in a node to support programming in multiple languages for the same platform. However, in order to achieve interoperability of heterogeneous platforms, the respective virtual machine on each platform is needed and thus the original interoperability problem may be seen to persist.

For the application layer, approaches such as OpenWSN and ZigBee introduce a very application specific application layer that can only be used in a specific application such as utility services or control and automation. These different application layers cannot be extended to build other sensor network applications and they do not interoperate as well.

Likewise, devices and solutions that enable interoperability between different network layer protocols such as 6LoW-PAN and ZigBee allow interoperability only in a peer-to-peer single hop setting and do not provide interoperability between two Wireless Personal Area Networks (WPANs). Co-existing WPANs can use the same radio interface with different protocol suites. For example, Zigbee, 6LoWPAN, WirelessHART and other IEEE 802.15.4 protocol based WPANs share the same wireless radio with each other. The radios of co-existing WPANs may also be different. For example, a WPAN may be Bluetooth based while the other may be UWB based.

Virtualization may be introduced into sensor networks in various ways. Examples include the following:
a. Create virtual sensors to compensate for the lack of physical sensors or to produce high-level processed data using low-level data from physical sensors.
b. Develop virtual programming environments that can generate platform-specific codes based on high-level logic.

However, these approaches require a unique software layer (operating system and application) to be used in place of the existing very rich operating platforms. They are not able to make use of the features and capabilities that are already available in the existing platforms and thus can be seen to not really solve the issue of interoperability. They also require programmers to be trained for programming in the new platform and thus the existing code-base is wasted.

According to one embodiment, a virtualization technology is used which addresses enabling heterogeneous layers to co-exist in the same sensor network or interoperate while in different sensor networks. One embodiment builds on top of existing platforms (e.g. hardware platforms) so that not only their features can be reused, but existing applications and code-base can also be integrated and reused. The virtualization framework according to various embodiments pushes the application limits of sensor networks by overcoming the existing limitation of using sensor nodes of a similar platform in a network.

In other words, according to one embodiment, the issue of heterogeneity of sensor devices is addressed by a semantics-based and service-oriented virtualization framework to handle the heterogeneities and enable transparent interoperability. The underlying philosophy of the virtualization framework according to an embodiment can be seen in changing the way applications are developed by introducing a virtualization layer between the operating system and sensor network applications. This, according to one embodiment, is illustrated in FIG. 4.

Figure 4:
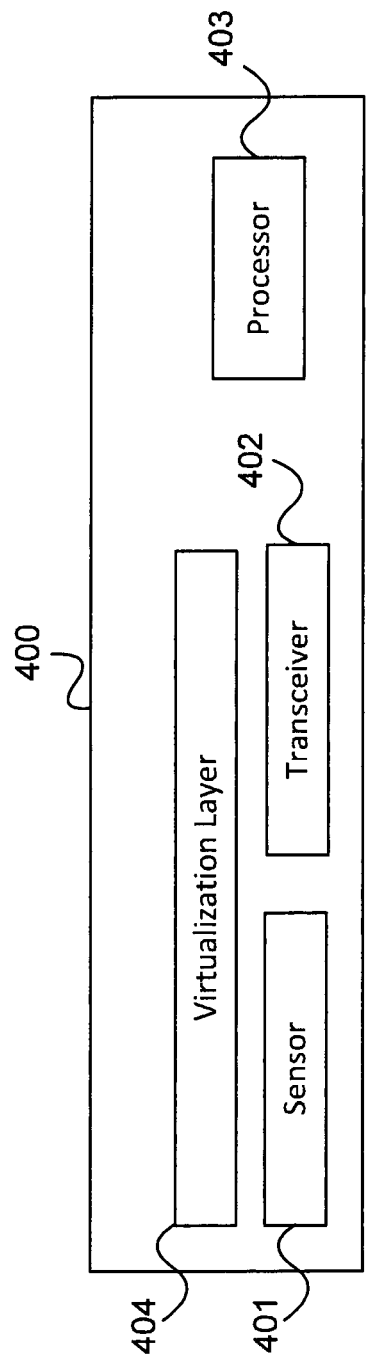
FIG. 4 shows two a sensor device according to an embodiment.

FIG. 4 shows a sensor device 400 according to an embodiment.

The sensor device 400 comprises a sensor 401, a transceiver 402 and a processor 403 configured to run an application.

The sensor device 400 further comprises a virtualization layer 404 which comprises an application programming interface encapsulating application layer features of the sensor device and which is configured to provide to the application, via at least one service access point, a service to communicate with another sensor device by means of the transceiver, a service to control the sensor and a service to at least one of discover a sensor device network, have the sensor device leave a sensor device network and have the sensor device join a sensor device network.

According to one embodiment, in other words, a virtualization layer encapsulates the functionalities of a sensor device (such as communication and sensor control) such that they are accessible, e.g. via a predetermined interface, i.e. predetermined service access points, by an application.

According to one embodiment, the processor is further configured to run an operating system and the virtualization layer is above the operating system layer.

According to one embodiment, the processor is further configured to run an operating system implementing a network protocol stack and the virtualization layer is configured to provide the service to communicate with another sensor device by means of the network protocol stack.

The virtualization layer may encapsulate the network protocol stack.

According to one embodiment, the service to control the sensor includes controlling the sensor to perform a sensing operation.

According to one embodiment, the virtualization layer comprises a runtime environment.

According to one embodiment, the sensor device comprises a hardware platform including the sensor and the transceiver. The hardware platform is for example MicaZ, iMote2, IRIS, TelosB, Atmel Raven, Gumstix or Sentilla JCreate but is not limited to these.

According to one embodiment, the service to communicate with another sensor device is a service to communication with another sensor device having a different hardware platform.

According to one embodiment, the virtualization layer provides routing functionality.

According to one embodiment, the virtualization layer provides network protocol translation functionality.

According to one embodiment, the processor is further configured to run a TinyOS, Contiki, .Net Micro Framework, embedded Linux or Sentilla operating system.

According to one embodiment, the processor is further configured to run an operating system and the service to communicate with another sensor device is a service to communication with another sensor device running a different operating system.

According to one embodiment, the virtualization layer is implemented by means of the processor.

Figure 5:
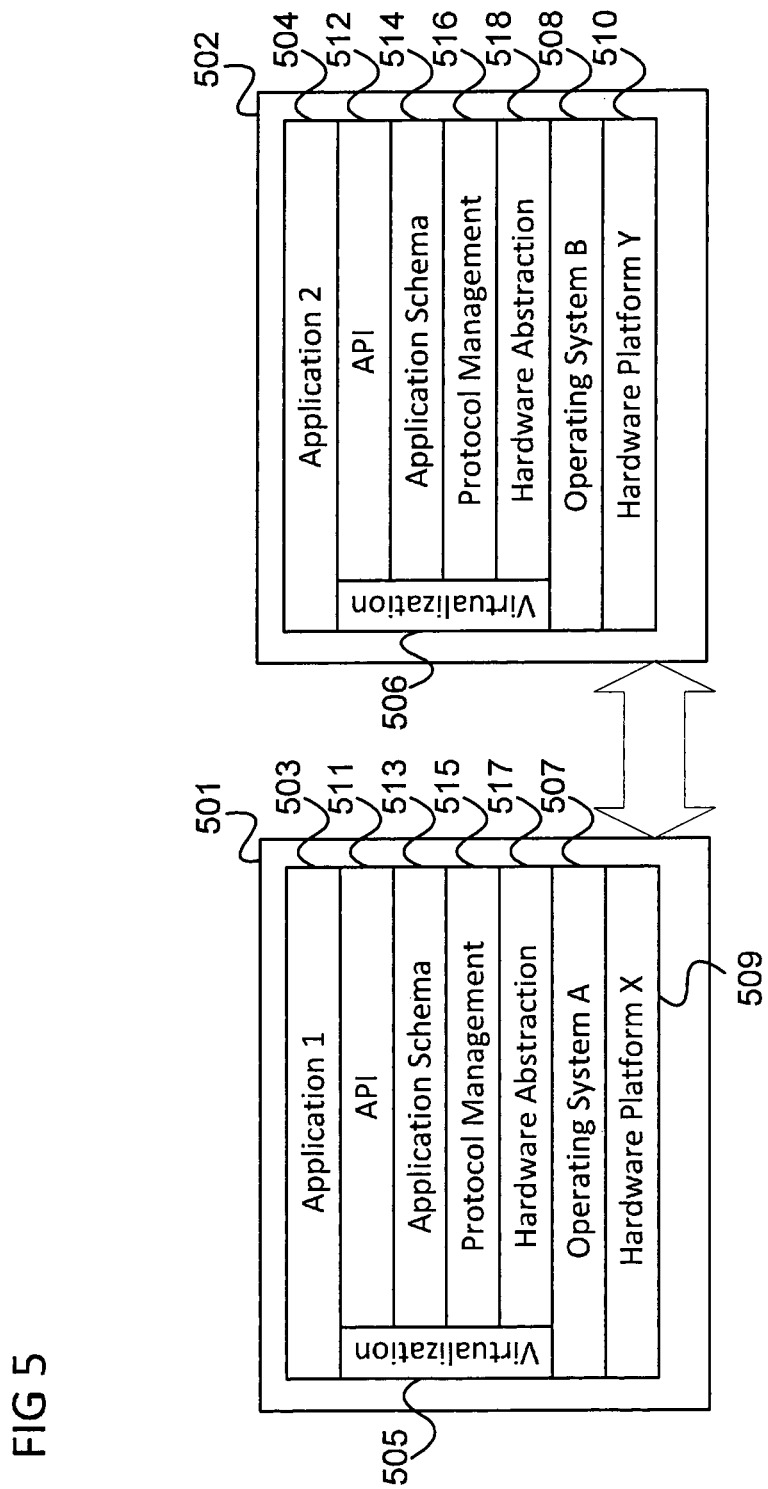
FIG. 5 shows two sensor devices according to an embodiment.

Two sensor device including a virtualization layer according to an embodiment are illustrated in FIG. 5.

FIG. 5 shows two sensor devices 501, 502.

In this example, each sensor device 501, 502 runs a respective application 503, 504, respective operating system 507, 508 and is based on a respective hardware platform 509, 510. Further, each sensor device 501, 502 includes a respective virtualization layer 505, 506.

Figure 6:
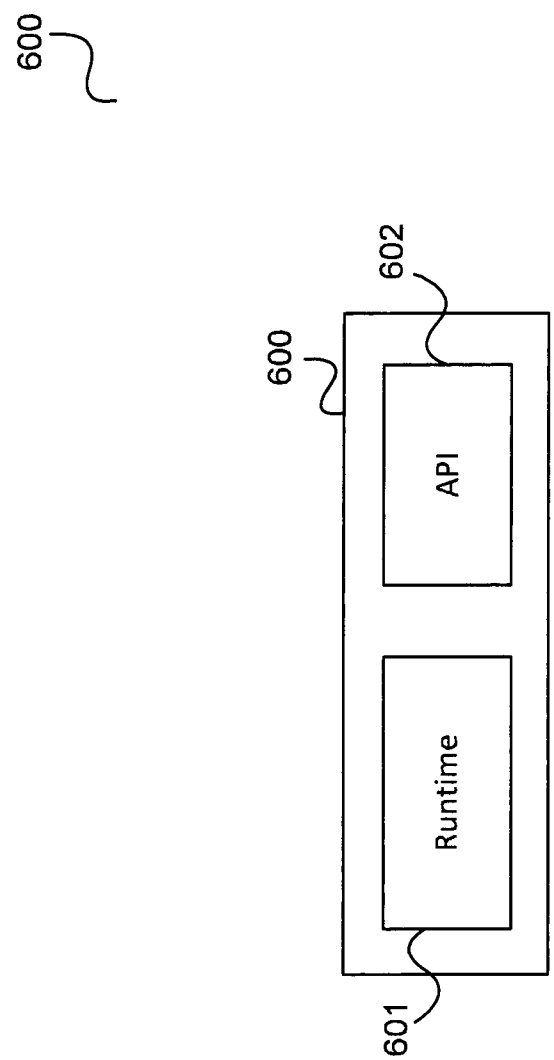
FIG. 6 shows a virtualization layer according to an embodiment.

The virtualization layer 505, 506 of each sensor device 501, 502 includes a runtime environment and an application programming interface (API) as it is illustrated in FIG. 6.

FIG. 6 shows a virtualization layer 600 according to an embodiment.

The virtualization layer 600 includes a runtime environment 601 and an API 602 which will be described in more detail below.

The virtualization layer 505, 506 of each sensor device 501, 502 includes four components, namely an API 511, 512, an application schema 513, 514, a protocol management component 515, 516 and a hardware abstraction component 517, 518.

On the application programming level, the application schema 513, 514, also referred to as Generalized Application Schema (GAS), and the Application Programming Interface (API) allow, through flexible configurations of those functions, accommodation of diversified applications. According to one embodiment, the design of this schema has three merits: 1) it is general enough to cover the requirements of diversified applications; 2) it provides over-the-air configurability such that the application can be easily configured and retrofitted; 3) it does not rely on central servers and control functions can be distributed into the system to reduce system traffic load and shorten event response time. The schema may be designed on top of a general sensor (and actuator) network and deals with the application layer of the protocol stack. According to one embodiment, under-layer protocols such as the physical layer, media access control (MAC) layer and network layer protocols are outside the scope of this schema. Adopting this approach in the application layer of each sensing and actuation device can help to shift the workload from pre-deployment system design to post-deployment application design. The time required for system development can be shortened and the deployment procedure can be simplified. Furthermore, the schema can also be used as a shared application interface in heterogeneous sensor and actuator networks to support both interoperability and scalability.

The application schema 513, 514 included in the virtualization layer 505, 506 provides a unified and generalized sensor network application schema. It enables integration and interoperability among distributed and heterogeneous sensor nodes and can serve as a unified application interface to integrate distributed applications through the Service-Oriented Architecture (SOA) approach. The API 511, 512 of the virtualization framework 505, 506 encapsulates the application schema 513, 514 into programming interfaces as well as provides functions for easy manipulation of under-lying networking protocols. With this API 511, 512 diversified sensor network applications conforming to the same application schema can be easily developed.

According to one embodiment, separate versions of the runtime 601 and the API 602 (e.g. of an API library) of the virtualization layer 505, 506 are built on top of different sensor network operating systems 507, 508 which may for example include TinyOS and Contiki. Building multiple versions of the virtualization layer 505, 506 on top of several popular operating systems enables interoperability among heterogeneous operating systems and also preserves the advantages of the large code-base and user community of these established operating systems. Programmers can stick to their familiar operating systems and enjoy a smooth learning curve of the transition phase towards virtualization.

The protocol management component 515, 516 takes care of protocol abstraction and encapsulation when the sensor node 501, 502 interconnects with other sensor nodes through networking protocols and enables interconnectivity between different networking protocols. Arbitrary stripped down versions of networking protocol suites may be supported by the protocol management component 515, 516 to cope with the energy limitations of the sensor nodes 501, 502.

The hardware abstraction component 517, 518 of the virtualization framework sits on top of the existing operating system 507, 508 and interacts directly with the underlying platform's hardware resources, i.e. the hardware platform 509, 510. It may for example enable transparent access to the underlying hardware resources from other sensor nodes with different operating systems.

Regarding the network level interoperability, connecting all sensor nodes or sensor networks to the Internet is a simple way to address interconnection issues. As long as all sensor networks (e.g. WPANs) are connected to the Internet, they can communicate with each other. However, as the Internet does not manage locality information of each WPAN. Even if co-existing WPANs can communicate with each other through the Internet, it is very difficult for them to discover their co-location status and cooperate on location-based issues.

On the contrary, local interconnectivity among co-existing WPANs not only provides connectivity but also helps to better exploit and share knowledge locally among the vicinity such that Location Based Services (LBS), which can be seen as crucial part of Ambient Intelligence technologies, could be greatly facilitated. With the usage of a virtualization layer according to various embodiments, local cooperation can be supported across different (device level) radio technologies and (system level) WPAN deployments. Further, a convenient way for instant data sharing among proximate devices without the support of other infrastructure based systems, such as the Internet, is provided.

With the current trend of connecting WPANs to the Internet, there are many corresponding efforts to decouple the applications of existing WPANs from their under-layer protocols and transplant them onto Internet protocol suites, such as the adaptation of ZigBee Application Layer (ZAL) over UDP. With the virtualization according to various embodiments, these decoupled applications can be directly adopted by embedded devices, despite their under-layer protocols. Designs of new applications of embedded devices can also be totally protocol transparent.

According to one embodiment, the virtualization framework provides the following features:
  Encapsulation of the network protocol stack in an Application Programming Interface (API) such that the programmers can develop intelligent techniques to dynamically switch between the various network layers and thus seamlessly connect to a multitude of personal and wide area networks.

Encapsulation of connectivity mechanisms such as WiFi, 3G, 6LoWPAN, ZigBee, etc.

Encapsulation and unification of application schema for sensing, actuation and control that supports wider range of application development for sensor networks.

Service-oriented mechanisms for discovering, joining, operating and leaving a sensor network with heterogeneous nodes.

Further features and effects of the virtualization framework according to various embodiments may include the following:

It changes the way sensor networks and other embedded devices are programmed. It provides an API that encapsulates the application layer features provided by each platform and develops unified application programming interfaces. Thus, programmers on different platforms need not re-think their application design for each different platform, and they can reuse the higher level application logic across the most common spectrum of sensor network application layers.

It allows reuse of already existing application code where a large amount of valuable man hours have already been spent.

It exploits the platform-specific application layer features, yet it allows interoperability between heterogeneous platforms via unified application interfaces.

It encapsulates the interconnectivity between the nodes and the networks and provides programming interfaces to make the nodes and networks intelligently switch between the network protocols.

By providing functions to build application and network gateways, it allows interoperability between heterogeneous wide and personal area networks.

Scalable design in terms of being able to accommodate new platform that may be available in the future.

Various embodiments can be seen to leverage the concepts of platform virtualization (PV), service-oriented architecture (SOA), and semantic web (SW) to address the incoherency between communication standards and data interpretation.

Platform Virtualization: Virtualization technologies may include operating system virtualization, storage virtualization, network virtualization, memory virtualization, I/O virtualization, application virtualization, desktop virtualization, etc. The concept of platform virtualization can be seen in developing an intermediate layer between the hardware resources and the operating platform such that any operating platform can be used on any underlying hardware.

Service-Oriented Architecture: The importance of SOA in enterprise computing is widely recognized. SOA is a software architecture to enable loosely coupled integration and interoperability of distributed heterogeneous systems by using services as component elements. Services are computational entities that can be described, published, discovered, orchestrated and invoked by other software entities. An SOA usually includes directory services that service providers register with. A request for a service with desired characteristics often results in a matchmaking process based on the profiles stored in the directory. Even if no adequate services are found in this manner, it is still possible to build composite services by combining several existing services.

Semantic Web: Semantics is the solution for finding meaningful information and integrating with the related information. This semantic provenance imposes a formally defined domain-specific conceptual view on sensor data, mitigates or eliminates terminological heterogeneity, and enables the use of reasoning tools for knowledge discovery. Ontology is the key technology behind semantics for making information more meaningful by adding more knowledge. The term ontology can be defined as an explicit formal specification of concepts. Ontology binds together classes or concepts that may have subclasses to represent more specific concepts than in super-classes, properties or relationships that describe various features and properties of the concepts, also termed as slots that are superimposed on the defined classes and/or properties to define allowed values (domain and range).

As illustrated in FIG. 5, the operation of the sensor nodes 501, 502 is categorized into different layers. The hardware platform layer 509, 510 of a sensor node 501, 502 specifies the physical attributes of the sensor node 501, 502 such as the sensor modules (e.g. one or more sensors), communication modules, the embedded processor and the memory. The next layer is the operating system layer 507, 508 that defines the firmware/middleware programming environment. The operating system layer 507, 508 exposes the capabilities of the sensor node 501, 502 (sensing, routing, storage, etc.) based on the underlying hardware platform 509, 510. The operating system may support a particular network layer and the application (or a plurality of applications) 503, 504 may be built on top of the operating system.

Thus, the manner in which the underlying platform is utilized by an application is largely defined by the operating system; how different nodes talk to each other is defined by the network layer; and how various nodes in the network implement and understand the application logic is defined by the application layer.

The virtualization layer 505, 506 allows two sensor nodes 501, 502 having different network and application layers with different mechanisms for data logging, data representation, data processing, and routing to interoperate.

According to one embodiment, the virtualization layer 505, 506 that sits on top of the operating system 507, 508 of a sensor device 501, 502 encapsulates the network layer and the application layer of the sensor device. This added layer functions on top of the operating system (also referred to as the host operating system) and provides the ability to use different application and network layers while making use of the system-level features provided by the operating system. This is illustrated in FIG. 7.

Figure 7:
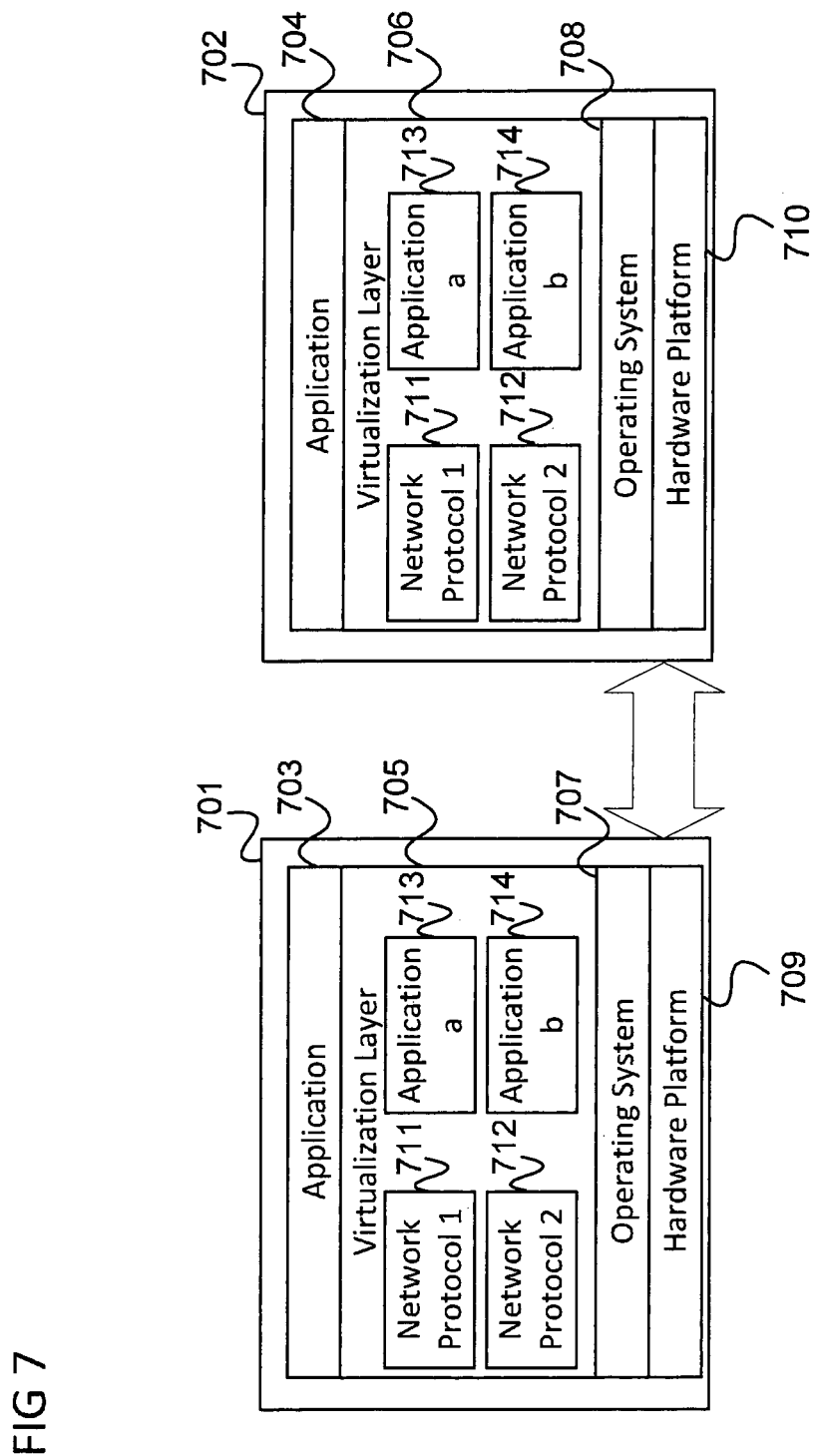
FIG. 7 shows two sensor devices according to an embodiment.

FIG. 7 shows two sensor devices 701, 702.

In this example, each sensor device 701, 702 runs a respective application 703, 704, has a respective virtualization layer 705, 706, runs a respective operating system 707, 708 and is based on a respective hardware platform 309, 310.

The virtualization layer 705, 706 of a sensor device 701, 702 supports various network protocols (e.g. a first network protocol 711 and a second network protocol 712) and applications (e.g. a first application 713 and a second application 714), and enables the programmers to develop applications 703, 704 on top of the virtualization layer. Thus, it is possible to exploit any network and application layer available within the virtualization layer 705, 706.

This design also allows making the application 503, 504 independent from the network protocols 711, 712. Thus, the application developer can simultaneously use traditionally incompatible network layers and application layers such as ZigBee on the application layer with 6LoWPAN on the network layer. In addition, he can also develop application and network layer gateways between two sensor networks or sensor devices running different network layer protocols and application layer protocols. Such gateways can perform the translation on the network layer and application layer and enable transparent interoperability between heterogeneous devices.

According to one embodiment, the overall design of the virtualization layer is based on the SOA such that the capabilities of the sensor nodes 701, 702 are exposed and used as services including the network layer and the application layer.

The runtime environment 601 (see FIG. 6) is for example a small footprint of the virtualization layer 600 that hosts core services to handle on-node jobs and network interconnectivity whereas the API 602 provides a unified mechanism for developing the programmer and application specific services that are also managed by the runtime environment 601 in a unified manner.

Figure 8:
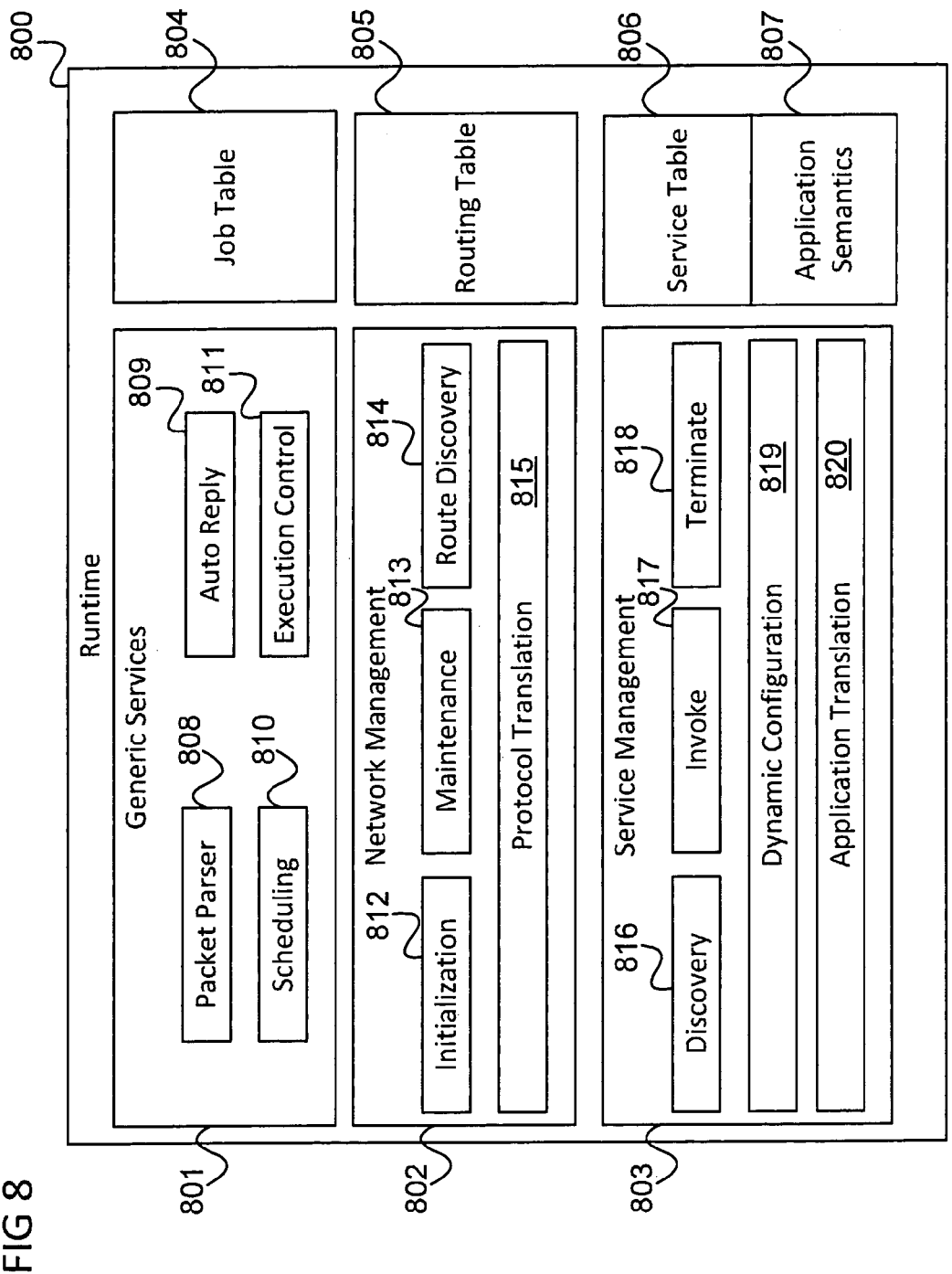
FIG. 8 illustrates the components of a runtime environment according to an embodiment.

The components of the runtime environment 601 according to an embodiment are illustrated in FIG. 8.

FIG. 8 illustrates the components of a runtime environment 800 according to an embodiment.

The runtime environment 800 (or virtualization layer runtime) comprises generic services 801, network management 802, service management 803, and tables 804, 805, 806 to keep track of jobs, routes and services. These runtime services either stay active all the time or are invoked on-demand to handle various tasks. A packet parser 808 of the generic services 801 receives all the in-bound packets and parses them to identify whether the packet should be routed or should be consumed by the node itself. For routing, the network management service route discovery 814 and the routing table 805 are utilized. If the packet is to be consumed by the sensor node itself, then an auto reply service 809 is invoked if the packet requests something from the sensor node that can be served by the services that are part of the node's runtime. For example, if the packet is for a service discovery, then a discovery service 816 in the service management 803 tier is invoked, and the details of the services hosted on the sensor node are retrieved from the service table 806 (which may for example include application semantics 807) and an automatic reply is sent back to the requesting party.

If the incoming packet requests for a sensing, actuation or automation control task to be initiated on the node, then the scheduling 810, execution control 811 and job table 804 components are used to schedule this task for execution.

The network management 802 components of the runtime also include a protocol translation service 815 that can dynamically switch from one protocol to the other. This component implements various network layer protocol stacks such as IEEE 802.15.4, TinyOS MAC, ZigBee and IPv6-based 6LoWPAN. Essentially, this component encapsulates various network layer protocols at the application layer and thus allows interoperability between heterogeneous network layers in a node-to-node or a node-to-network fashion. Initialization 812, maintenance 813 and route discovery 814 components of the network management 802 may also be employed for setting up the network layer, maintaining the routes and routing the traffic, respectively.

The virtualization layer runtime 800 also includes core components to manage the services on the node as part of the service management 803 functionalities. These include service discovery 816, invocation 817 and termination 818 components that are invoked automatically in response to requests. The service table 806 is maintained to serve as a registry for service configurations that can be dynamically retrofitted by a dynamic configuration component 813. The SOA approach provides application level interoperability between heterogeneous application layers and enables the building of a application/service translation component 820. This component makes use of the Application Semantics 807 for various application layers and allows programmers to translate to and fro between various applications.

Figure 9:
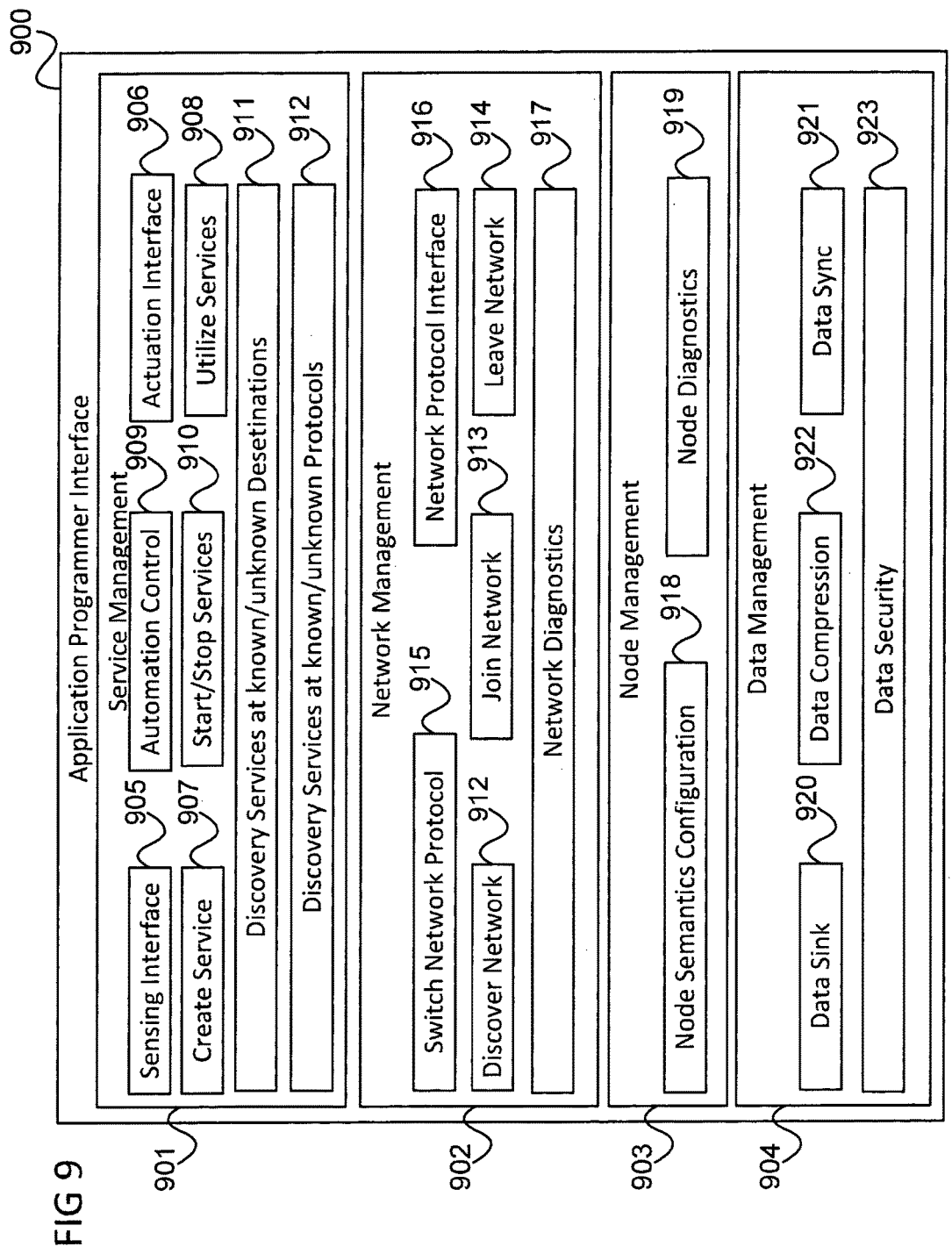
FIG. 9 illustrates the components of an API according to an embodiment.

The components of the API 602 according to an embodiment are illustrated in FIG. 9.

FIG. 9 illustrates the components of an API 900 according to an embodiment.

According to one embodiment, the virtualization layer API 900 builds on top of the native operating system and encapsulates application services, network protocols, node level and data management features to expose them as functions to the application programmers. The various components of the API 900 and their sub-components are shown in FIG. 9. The purpose of the API 900 is to enable application programmers to build sensor network applications in a unified manner by explicitly or implicitly using various application and network layers encapsulated within the API 900. The programmers develop application logic and the services specific to the application, and the deployment on the node will be handled by the virtualization layer's runtime core services. For example, the API 900 is implemented for the most common sensor network platforms that support C, Java and NesC languages. The libraries in the API belong to four main classes: service management 901, network management 902, node management 903 and data management 904.

Service management libraries 901 enable programmers to interface with the sensors and actuation hardware available on the node using a sensing interface 905 and an actuation interface 906. Through a create service library 907 and a utilize service library 908, the programmers can build complex workflows and deploy them on the nodes. An automation control library 909 provides a protocol-based approach for creating and activating complex control tasks, such as gathering data from a number of sensors, processing the data and reporting to the sink node in case of a significant event. Such automation controls are built on top of the existing core sensing and actuation services on the nodes. The service management 901 also allows starting and stopping services 910 and the building of the application logic to remotely discover services on known and unknown nodes 911 and over known and unknown protocols 912, thus enabling true interoperability.

The network management libraries 902 provide basic features such as discovering 912, joining 913 and leaving a sensor network 914. A switch network protocol interface 915 and a network protocol interface 916 are used in case of joining and operating in heterogeneous network layers. A convenient network diagnostics library 917 provides functions to detect anomalies in the network such as disconnections, bandwidth, throughput, etc. from the application layer's perspective.

Since the health of the node itself is also crucial and its semantics should also be configured for network visibility purposes and to design the application logic, the node management 903 provides a node semantics configuration library 918 and a node diagnostics library 919. The semantics management allows access to parameters such as the node's identification, visibility role, time sources, physical and logical location, network address, etc. The diagnostics that can be accessed include the node's battery, memory and CPU status, permanent storage, etc.

The data management library 904 can be seen as an important feature of the API 900 that provides basic data management and processing functions. These include a data sink function 920 to gather data from a node or the network to another location, data sync 921 between one or more nodes in the network, data compression 922 to conserve network bandwidth and data security 923 to preserve data privacy and allow authenticated access.

It should be noted that the API features can be used in a cascaded manner such that data can be gathered in a particular application layer context and processed in a different application and transmitted over a different network protocol. This feature allows truly scalable interoperability ease of programming over heterogeneous sensor network platforms.

The operating system is for example an RTOS (Real Time Operating System). In such an operating system, threads are termed tasks and can be scheduled individually through specifying priority and having delays within tasks. Similar to Contiki, a continuous service is needed to run a task. Inter-thread communication and coordination is achieved through RTOS primitives like mutexes, semaphores, events, mailboxes and timers. This is illustrated in FIG. 10.

Figure 10:
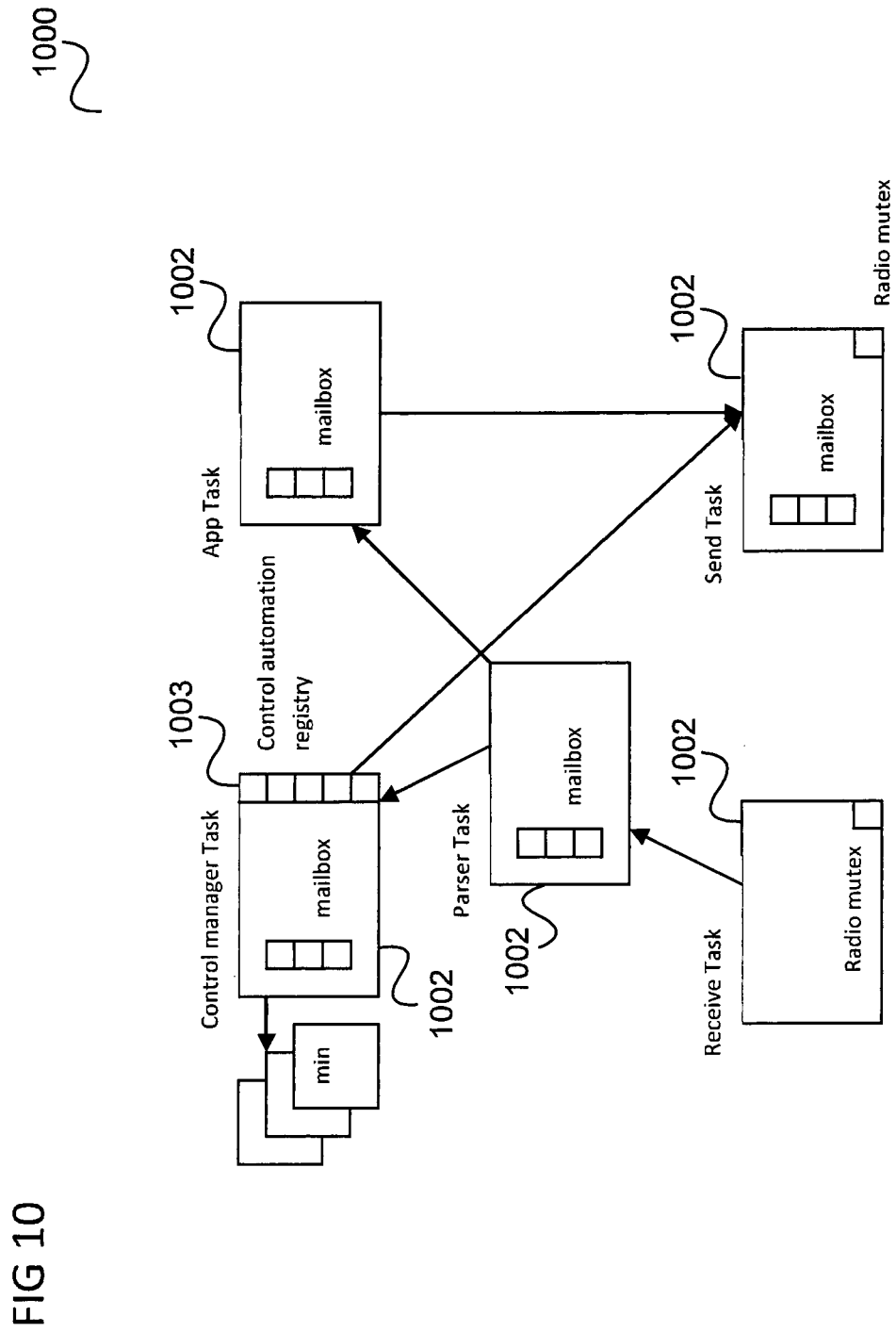
FIG. 10 is a task diagram that includes a control manager task, application task, parser task, receive task, and send task according to an embodiment.

FIG. 10 shows a task diagram 1000.

In the task diagram 1000, arrows 1001 represent possible calls to tasks 1002 including a control manager task, an app task, a parser task, a receive task and a send task. Every task 1002 other than the receive task has a mailbox which acts like a notification queue. Every send of an element into the queue notifies the task 1002. There is a mutex controlling the using of the radio resource shared by both the receive task and the send task.

The task functionalities are as described above, e.g. may include functionalities of the runtime 800 described with reference to FIG. 8. According to one embodiment, the control manager task handles creation, deletion and servicing of the automations by keeping a registry 1003 of similar content as the sensing manager which has been implemented. Each automation might be serviced by an individual timer. These control services can be passive or active. The control manager task also services control service discovery. The app (application) task resolves decisions made by application layer, such as receiving of data or service discovery report.

In the following, examples for control service packets are given.

A Control Auto Enabling Packet (with homogenous input and single output) may for example have the following format:

| 01001xxx Frame control | 8 bits Destination Auto ID | 8 bits Time window | 8 bits Method ID | Input List | Output List |
|---|---|---|---|---|---|

The following flags may be included (e.g. in the frame control field):
f1: homogeneous input?
f2: Src type of input sensing data (given f1 is ON)
  1. Control auto
  2. Sensing device
f3: output type
  1. Sensing data
  2. Actuation command The input list may for example have the following format.

| 8 bits Number of input | Input src type (f1 OFF) | 16 bits Src address of input 1 | 8 bits Src service ID/ Auto ID 1 | . . . |
|---|---|---|---|---|

The output list may for example have the following format:

| 8 bits Destination address of output | 8 bits Destination service ID/Auto |
|---|---|

According to one embodiment, a Sensing Data Report Packet as follows is used:

| 10101xxx Frame control | 8 bits Destination Auto ID | 8 bits Source Service ID/ Auto ID | Data Value | Time |
|---|---|---|---|---|

The following flags may be included (e.g. in the frame control field):
f1: ack—request
f2: auto—enabled
f3: Source service type, sensing service or control automation It should be noted that the broad application spectrum of sensor networks is well established. The deployment of large-scale sensor networks involves stakeholders such as government agencies, industrial companies, research institutions and system integrators. Sensor network applications have provided substantial benefits and cost savings through their remote surveillance, actuation and alert mechanisms. Thus the spectrum of sensor network applications is ever expanding and there is increased attention to seek higher returns on investment by reducing on-going infrastructural operational, repair and upgrade costs.

The sensor network virtualization technology according to various embodiments can be applied in a broad spectrum of application domains such as environmental monitoring, homeland security, battlefield operations, disaster warning and rescue, industrial automation, healthcare monitoring, transportation, smart buildings, smart grids, etc. Potential customers include sensor network technology providers and technology integrators. The technology integrators will indirectly represent their clients such as government agencies and large companies which require heterogeneous sensor network solutions. The demand for interoperable sensor network technologies from technology integrators may motivate sensor network technology providers to include support for a virtualization framework as provided according to various embodiments as a built-in feature of their platforms. Likewise, the ability to develop interoperable sensor networks may be necessary for many applications, thus promoting the adoption of a virtualization framework.

Sensor network platform providers may find greater interest in the technology according to various embodiments as it pushes the limits to which sensor networks can be applied. These providers may find it indispensable to provide the virtualization framework according to various embodiments as part of their product offerings due to the expected growing user interest.

Thus, as the sensor network market grows, the sensor network virtualization technology according to embodiments may find even greater clientele due to the flexibility and cost-value benefit it offers to customers.

While the invention has been particularly shown and described with reference to specific example embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A sensor device comprising
a sensor;
a transceiver;
a processor configured to run an application; and
a virtualization layer which comprises an application programming interface encapsulating application layer features of the sensor device and which is configured to provide to the application, via at least one service access point:
a service to communicate with another sensor device via the transceiver,
a service to control the sensor, and
a service to discover a sensor device network, have the sensor device leave the sensor device network and/or have the sensor device join the sensor device network, wherein the virtualization layer is configured to provide at least one of node-to-node or node-to-network interoperability between heterogeneous network layers, by providing network protocol translation functionality, wherein the virtualization layer is further configured to remotely discover services on nodes over unknown network protocols, wherein the unknown network protocols specify at least one of packet formats, traffic management, and network topologies of sensor device networks.

2. The sensor device according to claim 1, wherein the processor is further configured to run an operating system layer and the virtualization layer is above the operating system layer.

3. The sensor device according to claim 1, wherein the processor is further configured to run an operating system implementing a network protocol stack and the virtualization layer is configured to provide the service to communicate with the another sensor device via the network protocol stack.

4. The sensor device according to claim 3, wherein the virtualization layer encapsulates the network protocol stack.

5. The sensor device according to claim 1, wherein the service to control the sensor is configured to control the sensor to perform a sensing operation.

6. The sensor device according to claim 1, wherein the virtualization layer comprises a runtime environment.

7. The sensor device according to claim 1, comprising a hardware platform including the sensor and the transceiver.

8. The sensor device according to claim 7, wherein the hardware platform is MicaZ, iMote2, IRIS, TelosB, Atmel Raven, Gumstix or Sentilla JCreate.

9. The sensor device according to claim 1, wherein the service to communicate with another sensor device is a service to communication with the another sensor device having a different hardware platform.

10. The sensor device according to claim 1, wherein the virtualization layer provides routing functionality.

11. The sensor device according to claim 1, wherein the processor is further configured to run a TinyOS, Contiki, .Net Micro Framework, embedded Linux or Sentilla operating system.

12. The sensor device according to claim 1, wherein the processor is further configured to run an operating system and wherein the service to communicate with another sensor device is a service to communicate with the another sensor device running a different operating system.

13. The sensor device according to claim 1, wherein the virtualization layer is implemented by the processor.

* * * * *